INVENTOR.
CARL H. WERTH
BY
ATTORNEYS

# United States Patent Office 3,148,436
Patented Sept. 15, 1964

3,148,436
TOOL HOLDER ASSEMBLY
Carl H. Werth, Saginaw, Mich., assignor to Werth Engineering, Inc., Saginaw, Mich., a corporation of Michigan
Filed Dec. 17, 1962, Ser. No. 244,971
8 Claims. (Cl. 29—96)

This invention relates to tool holding assemblies and more particularly to assemblies for positively locating indexible disposable carbide cutting tool inserts which are generally diamond-shaped in configuration. The inserts which are to be described provide cutting edges at opposite ends thereof and when one end cutting edge becomes worn can be turned end-for-end. When both ends are worn, the tool insert can be thrown away and replaced with a new insert, since it would cost more to regrind the insert than to purchase a new one. Tools of this character are enjoying a good acceptance in industry for a variety of machining operations, including tracing, outfacing, plunge turning, recessing, and undercutting.

One of the problems to be overcome in producing a holder for such a tool is the difficulty of precision machining a tool holding recess in the holder which is configured not only to engage the parallel side wall portions which are provided intermediate the ends of the tool but also to engage the convergent end walls of the tool rearwardly thereof. This difficulty in accurately machining such surfaces in correct relative angular alignment can be overcome by combining a part with a recess having parallel side walls to engage the parallel walls of the tool insert with a second piece positively interfitting therewith which has a convergent recess for receiving an end of the tool. The present invention contemplates two such parts which are so relatively fixed in assembled relation that fore and aft movement of the two parts in a manner to change the end location of the tool is rendered impossible. Thus, with the present assembly it is possible to interrupt a cut and index the tool insert, and still maintain the high precision necessary to machine within close tolerances.

A further object of the invention is to provide a separate end locating member for the tool insert which is received by the tool body itself and is thereby fixed therein.

Another object of the invention is to provide an assembly in which the tool is particularly rigidly held to minimize cutting vibration and increase the life of the tool.

A further object of the invention is to provide a tool holder assembly of simple and economical construction including an easily releasable tool clamp plate facilitating convenient tool indexing which, when released or replaced, cannot affect the position of the locating member.

Other objects and advantages of the invention will be pointed out specifically or will become apparent from the following description when it is considered in conjunction with the appended claims and the accompanying drawings, in which:

Figure 6:
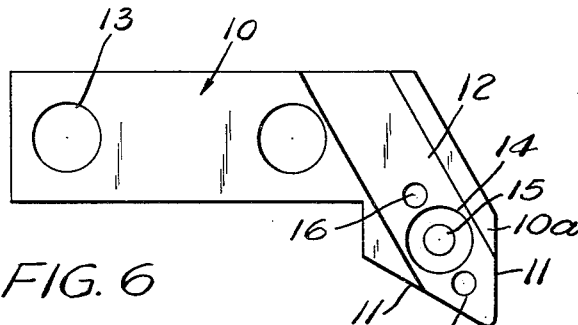
FIGURE 6 is a top plan view of the tool body only.

Referring now more particularly to the accompanying drawings and, in the first instance, to FIGURE 6, a tool body or support means 10 is shown as having a head end 10a with convergent walls 11 forming a cutting end with side clearances. Provided in the end portion 10a is a channel-like recess 12 which extends in bisecting relation to the corner formed by side walls 11, as shown. Openings 13 provided in the tool body 10 permit it to be readily fixed to a conventional tool arm by means of bolts or cap screws in any suitable manner.

Figure 3:
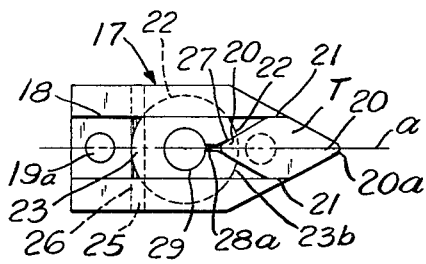
FIGURE 3 is a top plan view of the assembled insert mounting body and end locator member with the tool insert in position.
Figure 4:
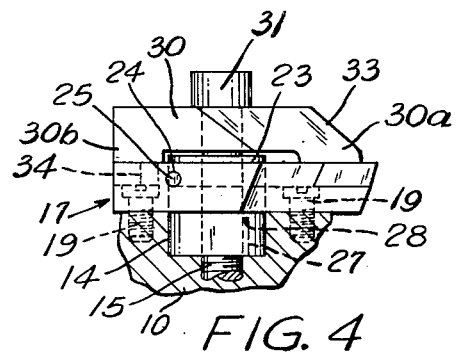
FIGURE 4 is a partly sectional, side elevational view indicating the manner in which the assembly is secured by the tool body.

Provided in the head end 10a of the tool body 10 is a blind locating bore or opening 14 and also provided, in axial alignment therewith, is a threaded bore 15 for a purpose which will later be mentioned. Threaded openings 16 are provided on opposite sides of the blind bore 14, as shown in FIGURE 6. Snugly but slideably received within the recess 12 is a tool bit or insert mounting body generally designated 17 which also has a channel-shaped recess 18, as shown in FIGURES 3 and 4, which is in fore and aft alignment with the recess 12. Cap screws 19 extending through openings 19a in the body 17 clamp the insert mounting body 17 in the recess 12 but, as will become apparent, the end location of the generally diamond-shaped tool insert T is not dependent on the accuracy of the threads of particular screws 19 and the threaded openings 16 in which they are received.

Figure 5:
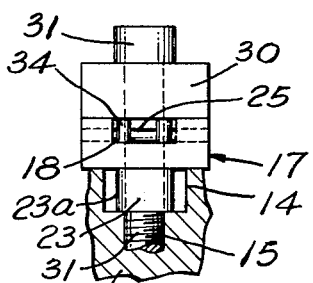
FIGURE 5 is a partly sectional, rear elevational view thereof.
Figure 7:
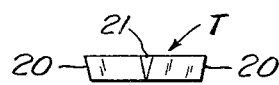
FIGURE 7 is a side elevational view of the tool only.

It will be seen that the tool insert T includes convergent end portions 20 provided with cutting surfaces 20a and parallel, vertical side wall portions 21 which are snugly but slideably received by the vertical, marginal side wall portions of the recess 18. Provided within the tool insert receiving body 17 centrally with respect to the width of recess 18 is a blind bore 22 which extends to communicate with the recess 18 and is so sized that an insert end locating sleeve or plug member 23 is a press fit therein. As shown in FIGURES 3–5, the member 23 is provided with flatted side walls 23a which are snugly received by the vertical, marginal walls of the recess 18. However, the end walls of the locating member 23 remain curvilinear, as at 23b, and make of the lower end a dowel which is a precision fit in the locating bore 14 in the tool shank 10. With the portions 23b a precision fit in the bore 14, the end location of the tool insert does not, as will become apparent, depend upon the precision of cap screws 19, which function to prevent lifting of the tool bit mounting body 17.

It will be seen that the end locating member or plug 23 is grooved, as at 24 (see FIGURE 4), to receive a pin 25 which extends through openings 26 provided in the tool bit mounting body 17 and prevents vertical movement of the tool bit mounting member 23 relative to member 17. Located centrally in member 23 with respect to the center line a of groove or recess 18 is a V-shaped vertical groove 27, and it will be seen that for a portion of its length as far down as the section 28, the groove 27 extends all the way rearwardly to communicate with a bore 29, provided vertically in the locator member 23, and thus provides a limited depth, dust accumulating passage 28a.

Provided to clamp the tool bit T from above is a clamp plate 30 which is secured by a clamp screw 31 extending through an elongated opening 32 provided therein and through the smooth faced bore 29 into the threaded opening 15 provided for it in the tool body 10. The clamp plate 30 includes a front pad portion 30a overlying and clamping the tool insert T in position and a rear pad portion 30b which spans the recess 18 and seats on the upper surface of tool insert mounting member 17.

Figure 1:
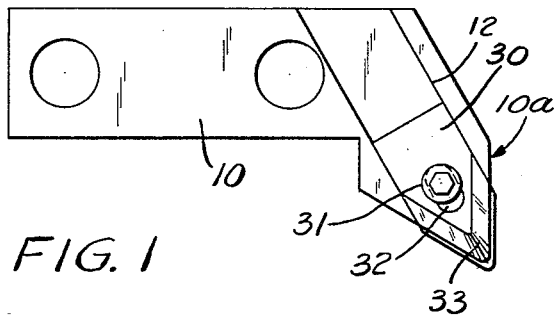
FIGURE 1 is a top plan view of the tool holder assembly with the various components thereof in assembled relation.
Figure 2:
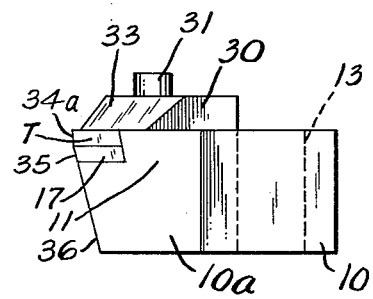
FIGURE 2 is an end elevation thereof.

The front face of the clamp plate 30 is beveled as at 33 to provide chip breaking surfaces and, of course, the slot 32 permits some longitudinal adjustment of the clamp plate 30 to permit the surfaces 33 to be positioned with best effect. Also provided on the clamp plate 30 are dependent pins 34 which are received within the channel 18 when the clamp plate is in position as shown, particularly in FIGURES 4 and 5. As shown particularly in FIGURE 2, each of the tool bit T, tool insert mounting member 17 and tool body portion 10a are provided with inclined clearance surfaces 34a, 35 and 36.

In practice, to index the tool insert T, when the cutting edge being used becomes worn, is a simple matter which requires only backing off the socket head cap screw 31 and lifting the clamp plate 33 so that the tool insert T can be turned end for end. Since the position of the member 23 is positively determined by the bore 14, the endwise position of the tool insert T remains the same. With the assembly which is shown, clamping of the plate 33 in position, following indexing of the tool insert T, cannot in any way affect the position of the locating plug or member 23. The engagement of the vertical, parallel wall portions 21 of the tool insert T with the vertical, parallel walls of recess 18 insures that the tool insert T will always be replaced in accurate alignment with the workpiece.

It should be apparent that I have perfected a tool holding assembly of great practicality which can be accurately indexed and permits attainment of all the advantages which are obtained by employing replaceable insert tools of the character described. It is to be understood that the drawings and descriptive matter are in all cases to be interpreted as merely illustrative of the principles of the invention, rather than as limiting the same in any way, since it is contemplated that various changes may be made in the various elements to achieve like results without departing from the spirit of the invention or the scope of the appended claims.

I claim:

1. A cutting tool assembly for holding a replaceable, indexible, polygonal, cutting insert having converging walls defining cutting ends thereon joined by a section having parallel side wall portions, comprising: tool body means; insert mounting and locating means mounted on said tool body means and including a part having a recess with an insert receiving surface thereon open to one end thereof; said recess having opposite side walls receiving said side wall portions of said insert and said part having a vertically extending opening therein; said insert mounting and locating means including a separate, vertically extending insert and receiving member fixed in said opening in said part and formed with an open, generally V-shaped recess at a spaced distance from the said end of the insert mounting and locating means for receiving and fixing the position of the cutting end of said insert which is not in use; precision fitting, locating dowel portion and dowel opening means for said insert mounting and locating means and said tool body means and releasable clamp means for said insert having a part overlying said insert for clamping said insert in position.

2. A cutting tool assembly for holding a replaceable, indexible, cutting insert having convergent ends joined by a mid-section having parallel side wall portions, comprising: support means having a locating opening therein; mounting body means mounted on said support means and having a channel-shaped recess in one face thereof opening to one end thereof and providing insert receiving surfaces; said mounting body means also having an opening therein extending normally to the extent of said recess; a separate end locating member having a part fixed in said opening to prevent fore and aft movement thereof relative to said channel and a part received in said locating opening in the support means, said locating member having a V-shaped recess diverging toward said end of the mounting body means shaped and positioned to snugly receive either end of said insert when said insert parallel side wall portions are in engagement with the walls of said recess; a clamp plate having a portion overlying said insert; and means for releasably securing said plate to clamp said insert in position.

3. The combination defined in claim 2 in which said latter means comprises a clamp screw and said end locating member has an opening through which said clamp screw extends into the support means.

4. The combination defined in claim 2 in which said clamp plate has dependent pins received in said channel-shaped recess.

5. The combination defined in claim 2 in which said locating member is transversely grooved and a pin extends through said mounting body means and the groove in said locating member.

6. A tool assembly comprising; a tool body with a front end corner having a channel-shaped recess in a face thereof extending toward said corner and opening to said corner; the tool body also having a bore open to said recess; mounting body means including parallel side wall portions and convergent end wall portions received in said recess with said side wall portions engaging the channel forming sides thereof and the said end walls extending respectively along sides of said corner, said mounting body means having a channel-shaped recess in its outer face opening to the end thereof proximate said corner and providing a flat insert receiving surface with parallel side wall sections; a replaceable, indexible, flat, cutting insert having convergent ends joined by a mid-section with parallel side wall portions snugly received by the parallel side wall sections of the recess in said mounting body means; the mounting body means having an opening therethrough normal to said channel-shaped recess; a locating plug projecting from both sides of said opening in said mounting body means and having parallel side walls snugly received by the channel-shaped recess in said mounting body means and curvilinear end walls snugly received in said bore in the tool body and opening in the mounting body means; the one end of said locating member having a V-shaped recess receiving and locating one of the convergent ends of said insert; a clamp plate with a convergent end overlying said insert and seating on said mounting body means; and a clamp screw for said clamp plate extending therethrough and through said locating member to anchor in said tool body.

7. A tool assembly comprising; a tool body having a channel-shaped recess in a face thereof; the tool body also having a bore open to said recess; mounting body means including parallel side wall portions received in said recess; said mounting body means having a channel-shaped recess in its outer face opening to the end thereof proximate said corner and providing a flat insert receiving surface with parallel side wall sections; a replaceable, indexible, flat, cutting insert having convergent ends joined by a mid-section with parallel side wall portions snugly received by the parallel side wall sections of the recess in said mounting body means; the mounting body means having a bore normal to said channel-shaped recess; a locating plug received in said bore in said mounting body means and the bore in said tool body; the one end of said locating member having a V-shaped recess receiving and locating one of the convergent ends of said insert; a clamp plate overlying said tool; and a clamp screw for said clamp plate extending therethrough and through said locating member to anchor in said tool body.

8. A cutting tool assembly for holding a replaceable, indexible cutting insert having convergent ends joined by a section having parallel side wall portions comprising: tool body means; insert mounting and locating means mounted on said tool body means and including a member having a recess with an insert receiving surface thereon open to one end thereof, and an opening therein extending normally to the extent of said recess; said recess having opposite parallel side walls receiving said side wall portions of said insert; said insert mounting and locating means including a separate, vertically extending, insert end receiving member fixed in said opening and having parallel side walls engaged with the walls of said recess; said insert end receiving member having a generally V-shaped recess for snugly receiving an end of said insert; precision fitting, locating dowel and dowel opening surfaces on said insert end receiving means and said tool body means to fix the relative positions thereof; and releasable clamp means for said insert having a part overlying said insert.

References Cited in the file of this patent

UNITED STATES PATENTS

| | | |
|---|---|---|
| 2,808,638 | Filippi | Oct. 8, 1957 |
| 2,999,301 | Conti | Sept. 12, 1961 |
| 3,059,316 | Bada | Oct. 22, 1962 |

FOREIGN PATENTS

| | | |
|---|---|---|
| 215,113 | Australia | Apr. 1, 1958 |
| 807,921 | Great Britain | Jan. 28, 1959 |
| 1,203,472 | France | July 27, 1959 |
| 868,012 | Great Britain | May 17, 1961 |
| 218,334 | Austria | Nov. 27, 1961 |